United States Patent [19]
Rousselot

[11] Patent Number: 4,712,440
[45] Date of Patent: Dec. 15, 1987

[54] LINEAR ACTUATOR
[75] Inventor: André Rousselot, Cluses, France
[73] Assignee: Somfy, France
[21] Appl. No.: 753,377
[22] Filed: Jul. 10, 1985
[30] Foreign Application Priority Data
  Jul. 18, 1984 [FR]  France .............................. 84 11375
[51] Int. Cl.⁴ ............................................. F16H 25/20
[52] U.S. Cl. .................................. 74/89.15; 74/424.8 R
[58] Field of Search ........................ 74/89.15, 424.8 R
[56]  References Cited
  U.S. PATENT DOCUMENTS

| | | | |
|---|---|---|---|
| 808,273 | 12/1905 | Darlington | 74/424.8 R |
| 2,356,861 | 8/1944 | Link | 74/424.8 R |
| 2,715,341 | 8/1955 | Hogan | 74/424.8 R |
| 2,771,498 | 11/1956 | Bredtschneider et al. | 74/424.8 R |
| 2,818,743 | 1/1958 | Zatsky | 74/424.8 R |
| 2,936,645 | 5/1960 | Morris et al. | 74/424.8 R |
| 2,944,437 | 7/1960 | Pickles | 74/424.8 R |
| 3,202,008 | 8/1965 | Geyer | 74/424.8 R |
| 4,226,129 | 10/1980 | Henderson | 74/89.15 |

Primary Examiner—Rodney H. Bonck
Assistant Examiner—David A. Testardi
Attorney, Agent, or Firm—Kane, Dalsimer, Kane, Sullivan and Kurucz

[57]  ABSTRACT

A linear actuator intended to actuate in particular the leaf of a door including a motor the output shaft of which is connected to a screw, for example a righthand screw, with which is engaged a nut, integral with which is an arm parallel with the screw and connected by a friction torque-limiter to an intermediate member fixed in rotation and intended to be connected to a member which is to be actuated, such as a leaf. The nut includes a first profiled portion turned towards the outside and designated to cooperate, when this nut is occupying only one end position, with a second profiled portion in the form of a bayonet joint connected to the face of a fixed member, this second portion surrounding at least locally the screw and the nut. This bayonet joint is orientated so as to prevent the nut, when it reaches this axial end position, from turning in the same direction as the motor shaft and the screw.

7 Claims, 12 Drawing Figures

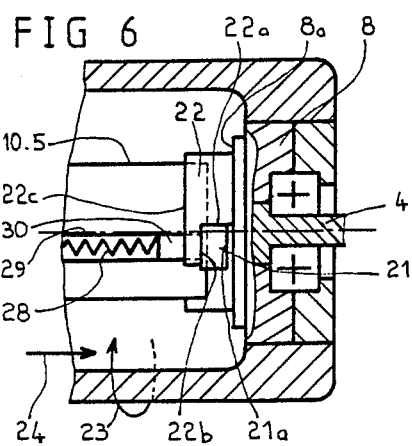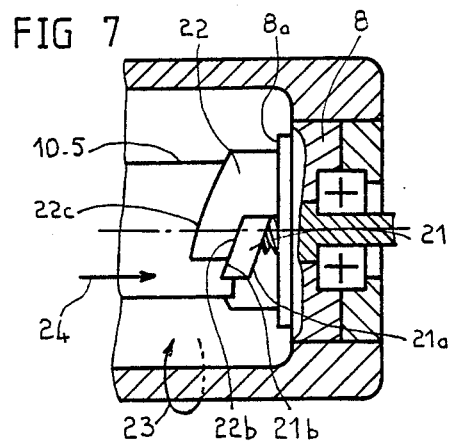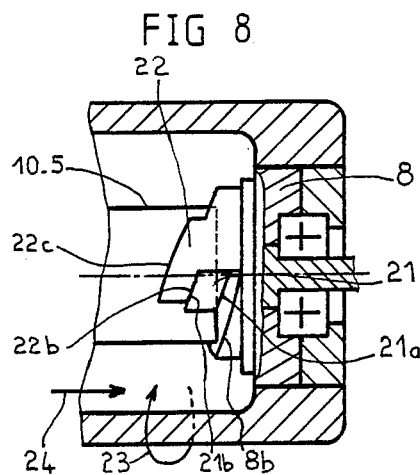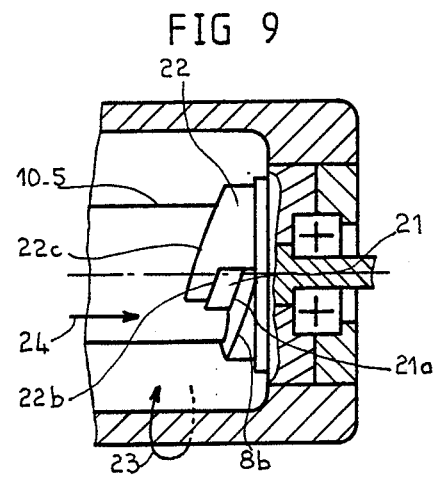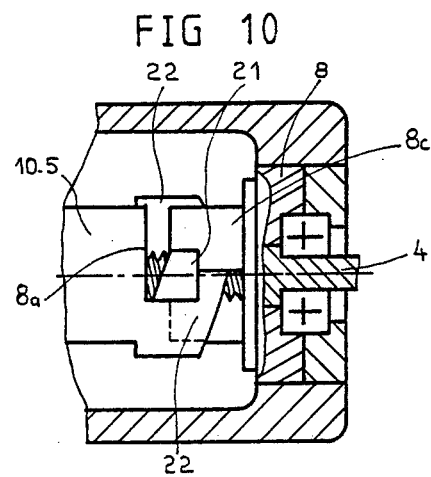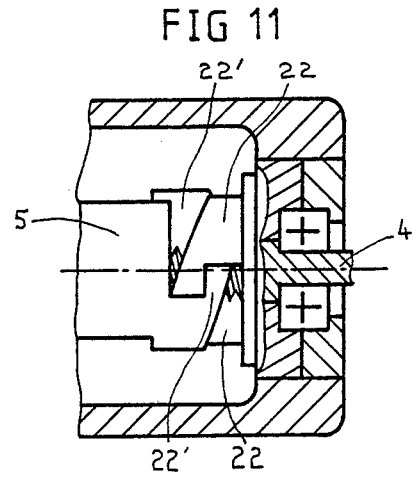

LINEAR ACTUATOR

FIELD OF THE INVENTION

The present invention is concerned with a linear actuator including a motor of any type: electric, hydraulic, pneumatic, the output shaft of which is connected kinematically to one of the two members forming a reversible screw-and-nut system. The second member of this screw and-nut system is integral with an operating arm parallel with the system and connected by a friction torque-limiter to an intermediate member rotationally fixed and intended to being connected to the member which is to be actuated.

PRIOR ART

In a known linear actuator of this species, which is intended, for example, for automatically actuating the wing of a gate or the leaf of a door, it is in fact necessary that the screw-and-nut system employed is reversible in order that when the leaf is closed it may be opened by hand in the event of accidental cut-off of the supply current to the electric motor controlling the linear actuator. A certain disadvantage follows from this because when the leaf is open it is capable of being closed by the force of the wind at the moment when a person or a vehicle is passing through the gate or the door with the risk of causing an accident.

SUMMARY OF THE INVENTION

The present invention proposes to enable the realization of a linear actuator which whilst being able to be actuated manually in the event of cut-off of the supply current to its motor when it is occupying one of its end positions of actuation, cannot be actuated inopportunely other than by its motor when it is occupying its other end position of actuation.

The linear actuator in accordance with the invention is characterized in that the second member of the screw-and-nut system includes at least one first profiled portion turned towards the outside and designed for cooperating when the said second member occupies only one of its two axial end positions, with respectively a second profiled portion supported by a fixed member which surrounds at least locally the screw-and-nut system. At least one of the two profiled portions has the shape of a bayonet joint orientated so as to prevent the second member when it reaches the said axial end position, from turning in the same direction as the driving shaft and as the first member and from moving away axially from this axial end position. The outer side of the bayonet joint is capable of serving as a stop and as a guide to the other profiled portion, until the latter penetrates into the entry into the bayonet joint, the said other profiled portion being arranged for sliding over the outer side of the bayonet joint.

The present invention offers a further advantage consisting in the fact that when the linear actuator is occupying this other end position of actuation it may in the event of cut-off of the current be actuated manually after the user has carried out a simple manipulation upon the actuator.

BRIEF DESCRIPTION OF THE DRAWINGS

The attached drawing illustrates by way of example embodiments in accordance with the present invention.

FIG. 6 represents partially in longitudinal section a second embodiment of the invention.

FIG. 7 represents partially in longitudinal section a third embodiment of the invention.

FIG. 8 represents partially in longitudinal section a fourth embodiment of the invention.

FIG. 9 represents partially in longitudinal section a variant upon the fourth embodiment of the invention.

FIG. 10 represents partially in longitudinally section a variant upon the first embodiment, and FIG. 11 represents partially in longitudinal section another variant upon the first embodiment.

DESCRIPTION OF THE PREFERRED EMBODIMENTS

Figure 1:
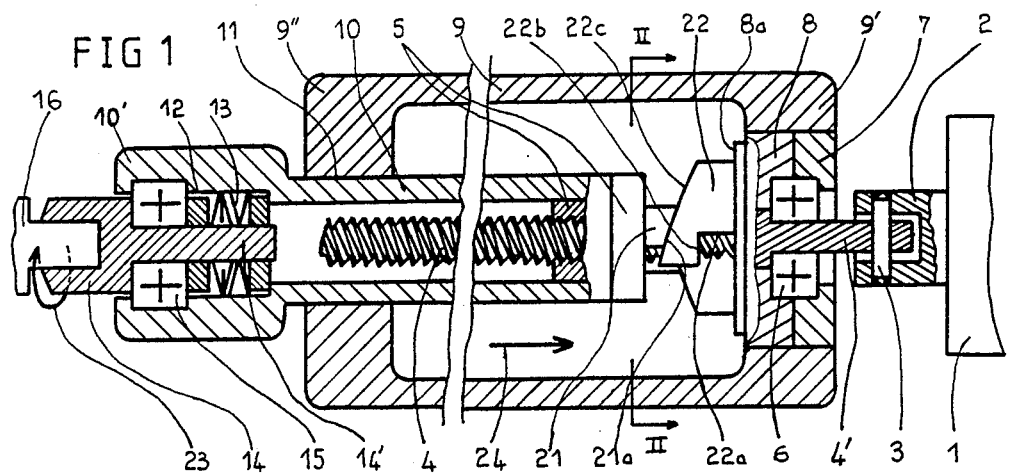
FIG. 1 represents in longitudinal section a first embodiment of the linear actuator.
Figure 2:
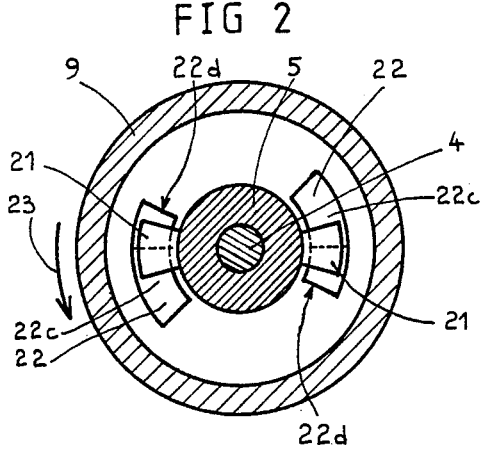
FIG. 2 represents in section along II—II in FIG. 1 the same first embodiment in a first phase of operation.
Figure 3:
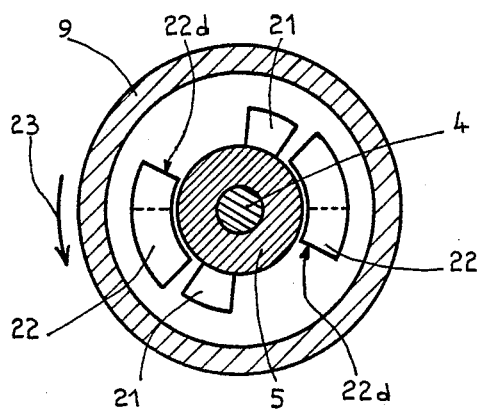
FIG. 3 represents in section along II—II in FIG. 1 the same first embodiment in a second phase of operation.
Figure 4:
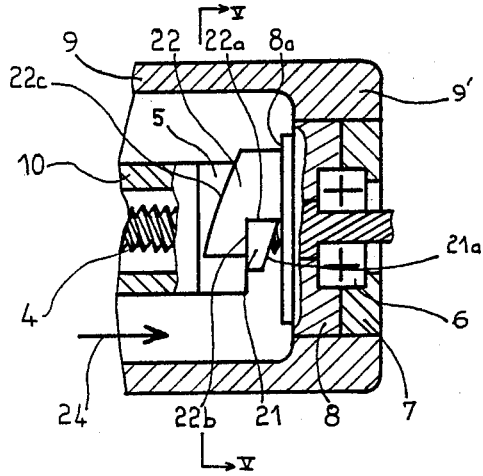
FIG. 4 represents partially in longitudinal section the same first embodiment in a third phase of operation.
Figure 5:
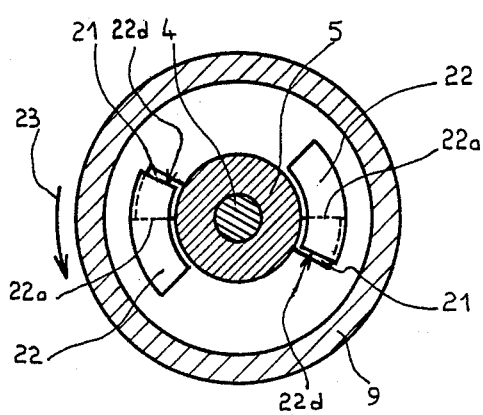
FIG. 5 represents in section along V—V in FIG. 4 the same first embodiment.

As represented in FIGS. 1 to 5 the linear actuator in accordance with the invention includes a motor 1, for example, an electric motor, the output shaft 2 of which is integrated angularly by a pin 3 with the end portion 4' of the first member of a screw-and-nut system consisting in this example of the screw 4, the second member of this system consisting of a nut 5 constantly in engagement with the screw 4 which is, for example, a right-hand screw. The slope of the thread and the number of threads are such that the screw-and-nut system is reversible. The end portion 4' is supported, for example, by a ball bearing 6 held between two fixed rings 7 and 8 integral with the first end 9' of a casing 9. The nut 5 is integral with an operating arm 10 parallel with the screw-and-nut system and consisting in this example of a tube which is designed to slide and turn in a cylindrical bearing 11 provided in the second end 9" of the casing 9 (FIG. 1).

The free end portion 10' of the operating arm 10 outside the casing 9 contains in an axial cylindrical seating 12 a friction torque-limiter 13 connecting this free end portion 10' to one end 14' of an intermediate member 14 consisting, for example, of a fork having its end mounted to pivot in the seating 12 by a ballbearing 15. This intermediate member 14 is connected to an actuator member 16 forming part, for example, of the leaf of a door and is fixed this member 16 so that it does not rotate.

The nut 5 includes at the side opposite from the tubular arm 10 two profiled portions 21 diametrically opposite to one another and positioned on the outside of this nut 5. The two portions 21 are provided for cooperating, when this nut 5 is occupying the second of its two axial end positions (FIGS. 4 and 5), with respectively two profiled portions 22 supported by the fixing ring 8, these two profiled portions 22 surrounding the end of screw-and-nut system locally. In this example the profiled portions 22 have the shape of bayonet joints orientated so that when the nut 5 has reached the said axial end position it is prevented by their stops 22a (FIGS. 1 and 4) from turning in the same direction 23 (FIG. 1) as the driving shaft 2 and as the screw 4 and by their inner sides 22b from separating axially from this axial end position.

In this example the two profiled portions 22 in the shape of bayonet joints are connected to one face 8a of the ring 8 which supports them, this face being circular. The inner side 22b of each bayonet joint 22 is parallel with this radial face 8a. On the other hand the outer side 22c opposite to the inner side 22b of each bayonet joint 22 is, in this example, inclined with respect to this radial face 8a in a direction which is the opposite of that of the pitch of the screw-and-nut system, that is to say, to the left in this example. The two profiled portions 21 also have a front outer side 21a which is inclined in the same way as the outer sides 22c so as to be able to serve as an axial stop to prevent movement in the direction 24 and as a guide in the direction 23 to the profiled portions 21 until the latter penetrate each into the entrance 22d to a bayonet joint 22.

When the screw 4 is driven in rotation by the motor shaft 2 in the direction opposite to 23, the nut 5 is displaced axially only, in the direction opposite to 24 until the operating arm 10 has been elongated substantially to the maximum in order to control the closing of the leaf of the door. When the leaf 16 is totally closed (the arm extended to the amount desired) the axial displacement of the arm 10 is prevented and the low functional resistance of the torque-limiter 13 enables the arm to continue to turn with the screw the screw 4 until the power supply to the motor 1 is cut off.

If a power supply breakdown then occurs, it is possible after having unlocked the leaf 16 of the door to open it by hand, which causes, the screw-and-nut system being reversible, the shortening of the arm 10 by rotation in the direction opposite to 23, of the nut 5 on the screw 4 which is held fixed in rotation by the motor 1. It is the friction of the torque-limiter 13 which enables this rotation of the nut 5. The low frictional resistance of the torque limiter is less than the torque of reversibility of the motor 1.

This rotation ceases when the inclined outer sides 21a of the profiled portions 21 of the nut 5 come into contact with the inclined outer sides 22c of the bayonet joints 22.

In normal operation in the absence of a breakdown in the supply, it is the motor shaft 2 turning in the direction 23 (FIG. 1) which causes the axial displacement only, in the direction 24, of the nut 5 and of the operating arm 10 and hence progressive opening of the leaf 16. As soon as the inclined outer sides 21a of the first profiled portions 21 come into contact with the inclined outer sides 22c of the second profiled portions 22 (FIGS. 1 and 2), the nut 5 and the arm 10 turn in the direction 23 in the same direction as the screw 4, the outer sides 21a and 22c sliding against one another, this rotation being allowed by the friction torque-limiter 13. As soon as the first profiled portions 21 pass beyond the lowest end of the inclined outer sides 22 (FIG. 3) they are again displaced axially only in the direction 24 until the nut 5 comes to bear against a ring, not shown in the drawing, which is integral with the end portion 4' of the screw 4. The nut 5 then turns again in the direction 23 at the same time as the screw 4 until the first profiled portions 21 penetrate respectively into the second profiled portions 22 in the form of bayonet joints (FIGS. 4 and 5) and finally come to bear against the fixed stops 22a behind the inner sides 22b. The supply to the electric motor 1 is then cut off.

If during the axial displacement of the nut 5 in the direction 24 the first profiled portions 21 do not come into contact with the outer sides 22c of the second profiled portions 22 but pass in front of or behind the inclined the outer sides 22c, the nut 5 continues its axial displacement until it comes to a stop against the ring integral with the end portion 4' of the screw 4. As described in the preceding paragraph the nut 5 turns in the direction 23 at the same time as the screw 4 until its first profiled portions 21 penetrate into the second profiled portions 22 in the form of bayonet joints.

If a pull is inopportunely exerted in the opposite direction to 24, for example, by the wind acting against the open leaf 16, this pull tends to cause rotation in the direction 23 of the arm 10 and of the nut 5 against the action of the friction of the torque-limiter 13. This rotation is prevented by the second profiled portions 22 in the form of bayonet joints which retain the first profiled portions 21 of the nut 5. Any inopportune closure of the leaf 16 is thus prevented.

When the motor 1 drives its shaft 2 in rotation in the direction opposite to 23, the nut 5, prevented from being displaced axially by the inner sides 22b, is first of all driven in rotation in the same direction, causing the friction of the torque-limiter 13 to operate. As soon as the first profiled portions 21 have become disengaged from the second, fixed, profiled portions 22, the nut 5 and the arm 10 are free to be displaced axially again in the direction opposite to 24 as previously described.

In the case of a breakdown in the supply, with the leaf 16 open, it is possible to unlock the linear actuator deliberately in order to close the leaf 16 manually. In order to do that it is suficient to drive in rotation manually in the direction opposite to 23 the free end portion 10' of the operating arm 10 against the action of the friction torque-limiter. As soon as the first profiled portions 21 have become disengaged from the second, fixed, profiled portions 22, it is sufficient to act upon the leaf 16 in order to effect a pull on the fork 14, tending to elongate the arm 10, which causes the rotation in the direction 23 of the arm 10 and of the nut 5. The friction torque-limiter 13 allows rotation of the arm 10 without rotation of fork 14.

The second embodiment of the invention, represented partially in FIG. 6, differs from the first embodiment (FIGS. 1 to 5) solely by the fact that the outer side 22c of each second profiled portion 22 in the form of a bayonet joint is like the inner side 22b parallel with the circular face 8a. In addition, each first profiled portion 21, supported by a pusher 30, which moves only axially over the outside of the nut 5 towards the rear in the direction opposite to 24, against the action of a compression spring 28 in a longitudinal groove 29 provided in the nut 5. Again, the front outer side 21a of each first profiled portion 21 is no longer inclined, as in embodiment 1, but rather parallel with the face 8a. All of the other constituent parts are identical with those of the first embodiment (FIGS. 1 to 5).

When the screw 4 is driven in rotation in the direction 23 by the driving shaft 2, the arm 10 and the nut 5 are displaced axially only, in the direction 24 towards the second, fixed, profiled portions 22. If the latter are in the path of the first profiled portions 21, these first portions 21 finally come into contact with the second portions 22 and are thus held immovable axially. As soon as the springs 28 have been sufficiently compressed, the friction of the torque-limiter 13 operates and the arm 10 and the nut 5 turn in the direction 23 whilst the springs 28 continue to be compressed. As soon as the first profiled portions 21 pass beyond the rear ends of the outer sides 22c, they are displaced abruptly in the direction 24 under the action of the springs 28 and resuming their rotation in the direction 23 they penetrate into the second profiled portions 22 in the form of bayonet joints, and reach the position represented in FIG. 6. The remainder of the operation is identical with that previously described (FIGS. 1 to 5).

Figure 12:
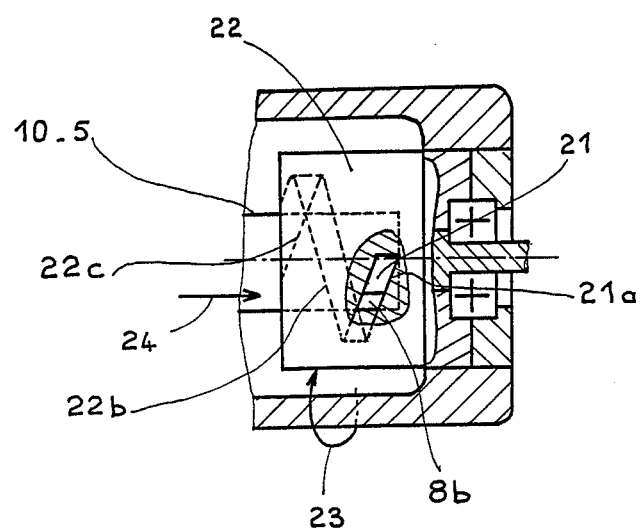
FIG. 12 represents partially in longitudinal section another variant upon the first embodiment.

The third embodiment represented partially in FIG. 7, and more detail in FIG. 12 differs from the first (FIGS. 1 to 5) solely by the fact that the inner side 22b of each second profiled portion 22 is like the outer side 22c inclined with respect to the radial face 8a in a direction opposite to that of the pitch of the screw-and-nut system, hence towards the left in this example. This inclination of the inner sides 22b is advantageously less than that of the threads of the screw-and-nut system so that these inner sides 22b can oppose any axial displacement in the direction opposite to 24, of the first profiled portions 21 which are seated behind these inner sides 22b when a pull is inopportunely effected in this direction on the arm 10. Again, the side 21b opposite the side 21a of each first profiled portion 21 is advantageously inclined in the same direction as the side 21a and as the inner side 22b.

The fourth embodiment represented partially in FIG. 8, differs from the third embodiment previously described (FIG. 7) solely by the fact that the second profiled portions 22 in the form of bayonet joints are connected to a face 8b of the member 8 which supports them, this face not being in a plane substantially perpendicular to the longitudinal axis of screw 4 like the preceding face 8a but inclined in a direction opposite to that of the pitch of the screw-and-nut system, hence towards the left in this example, like the sides 21a, 21b and 22b, 22c.

The operation of this fourth embodiment is similar to that of the other embodiments previously described (FIGS. 1 to 7). The only difference lies in the fact that in order to close the leaf by hand in the event of a breakdown in the power supply it is necessary that as the free end portion 10' of the arm 10 is driven manually in rotation in the direction opposite to 23 while simultaneously exerting an axial pull on the arm 10 must be simultaneously exerted so that the first profiled portions 21 can turn in spite of the presence of the corresponding inclined faces 8b.

In accordance with a variant upon this fourth embodiment, represented partially in FIG. 9, this inclined face 8b to which is connected the profiled portion 22 in the form of a bayonet joint, is arranged in prolongation of the corresponding outer side 22c of a bayonet joint so that there is not the step in the face of 22c that is seen in FIG. 8. In this way, whatever the points at which the first profiled portions 21 come into contact with the inclined outer sides 22c or with their prolongation 8b at the time of their axial displacement in the direction 24, they then follow these inclined sides 22c and 8b before being seated finally in the respective profiled portions 22 in the form of bayonet joints, by turning in the direction 23.

In accordance with a particular case of this variant of the fourth embodiment, not shown in the drawing, the two sides, the inner side 22b and the outer side 22c, of each second profiled portion 22 in the form of a bayonet joint, and the corresponding inclined face 8b to which is connected the bayonet joint, form a thread system, of two threads in this example, of opposite hand to that of the screw-and-nut system. In this case each outer side 22c forms the entrance to one of the two threads with which cooperate either first profiled portions 21 or a thread system of corresponding pitch provided on the perimeter of the nut 5.

Without departing from the scope of he present invention, in all of the embodiments which have just been described the profiled portion or portions 22 in the form of bayonet joints may instead of being fixed in integral with the ring 8, be movable and integral with the nut 5 (FIG. 10). In FIG. 10 is represented, for example, a variant upon the first embodiment (FIGS. 1 to 5), in which the profiled portions 22 in the form of bayonet joints as well as the face 8a which supports them, form part of the nut 5 integral with the arm 10. As to the profiled portions 21, they are integral with a fixed prolongation 8c of the ring 8. The operation of the whole is identical with that of the first embodiment (FIGS. 1 to 5).

Similarly in all of the embodiments previously described (FIGS. 1 to 9), the profiled portions cooperating together may consist solely of the profiled portions 22 in the form of bayonet joints. Thus in FIG. 11 is represented, for example, another variant upon the first embodiment (FIGS. 1 to 5), in which the two profiled portions 22 in the form of bayonet joints, in the actuator as in FIG. 1, cooperate respectively with two profiled portions 22' identical with the preceding but orientated in the opposite direction and integral with the nut 5. The operation of the whole is identical with that of the first embodiment (FIGS. 1 to 5).

In all of the other embodiments represented in the drawing, it is the screw 4 which is made integral with the shaft 2 of the motor. The present invention is equally applicable in the case where it is the nut 5 which is integral with the shaft 2, the screw 4 being displaceable axially with respect to the nut 5, for example, in an axial seating provided through the driving shaft 2, the profiled portions turned towards the outside being, for example, supported by a bush integral with the screw 4 and including the profiled portions 21 or 22 as the case may be, on its outer perimeter.

What is claimed is:

1. A linear actuator comprising a motor having an output shaft which is connected kinematically to a first member, a reversible screw-and-nut system capable of movement in a first and second direction, said system comprising said first member and a second member, said screw-and-nut system having a pitch in a first direction, said second member of this screw-and-nut system being integral with an operating arm which moves parallel with said reversible screw, said second member capable of movement between a first axial position and a second axial end position, said second member of the screw-and-nut system includes at least one first profiled portion positioned on the outside of said second member, a friction torque-limiter connected to said second member and to an intermediate member rotationally fixed and intended for being connected to a device which is to be actuated, a fixed member having a second profiled portion which cooperates with said first profiled portion when said second member occupies said second axial end position, said fixed member surrounds at least locally the screw-and-nut system, at least one of the two profiled portions having the shape of a bayonet joint oriented so as to prevent the second member, when it reaches the said second axial end position, from turning in a direction corresponding to that of the driving shaft and said first member and from moving away axially from this second end position when said intermediate member is pulled out and said motor does not rotate, said bayonet joint having an outer side and an inner side, said outer side capable of serving as a stop and as a guide to said first profiled portion, until the latter penetrates an entrance into the bayonet joint, the said other profiled portion being arranged for sliding over the outer side of the bayonet joint.

2. A linear actuator according to claim 1, wherein the profiled portion in the shape of a bayonet joint is connected to one face of the member which supports it, this face being in a plane substantially perpendicular to a longitudinal axis of said screw, the inner side of the bayonet joint being parallel with the said planar face and the outer side being inclined with respect to this face in a second direction which is the opposite of that of the pitch of the screw-and-nut system.

3. A linear actuator according to claim 1, wherein the profiled portion in the shape of a bayonet joint is connected to one face of the member which supports it, this face being in a plane substantially perpendicular to a longitudinal axis of said screw, the two sides, inner and outer, of the bayonet joint being parallel with the said planar face, and the first profiled portion being movable on the second member of the screw-and-nut system axially only against the action of a compression spring.

4. A linear actuator according to claim 1, wherein the profiled portion in the shape of a bayonet joint is connected to one face of the member which supports it, this face being in a plane substantially perpendicular to a longitudinal axis of said screw, the two sides, inner and outer, of the bayonet joint being inclined with respect to the said face in a second direction which is the opposite of that of the pitch of the screw-and-nut system.

5. A linear actuator according to claim 1, wherein the profiled portion in the shape of a bayonet joint is connected to one inclined face of the member which supports it, this face being inclined in a second direction which is the opposite of that of the pitch of the screw-and-nut system, and the same as that of the two sides, inner and outer, of the bayonet joint.

6. A linear actuator according to claim 5, wherein the inclined face to which is connected the profiled portion in the shape of a bayonet joint, is arranged in prolongation of an inclined outer side of a bayonet joint.

7. A linear actuator according to claim 6, wherein the two sides, inner and outer, of the profiled portion in the shape of a bayonet joint, and the inclined face to which the bayonet joint is connected, form a thread of pitch which is the opposite of that of the screw-and-nut system.

* * * * *